(12) United States Patent
Lee et al.

(10) Patent No.: US 9,357,574 B2
(45) Date of Patent: May 31, 2016

(54) BLUETOOTH DEVICE PAIRING METHOD AND BLUETOOTH DEVICE

(71) Applicant: Samsung Electronics Co., Ltd., Gyeonggi-do (KR)

(72) Inventors: Jae-Hyeok Lee, Gyeonggi-do (KR); Tae-Yong Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 40 days.

(21) Appl. No.: 14/102,848

(22) Filed: Dec. 11, 2013

(65) Prior Publication Data

US 2014/0179234 A1 Jun. 26, 2014

(30) Foreign Application Priority Data

Dec. 24, 2012 (KR) .................. 10-2012-0151843

(51) Int. Cl.
*H04B 7/00* (2006.01)
*H04W 76/02* (2009.01)
*H04W 4/00* (2009.01)
*H04W 8/00* (2009.01)

(52) U.S. Cl.
CPC ............ *H04W 76/023* (2013.01); *H04W 4/008* (2013.01); *H04W 8/005* (2013.01)

(58) Field of Classification Search
USPC ........................ 455/41.1, 41.2, 41.3
See application file for complete search history.

(56) References Cited

U.S. PATENT DOCUMENTS

| 2010/0120364 | A1* | 5/2010 | Lee et al. | 455/41.2 |
| 2010/0130131 | A1* | 5/2010 | Ha et al. | 455/41.3 |
| 2012/0154115 | A1* | 6/2012 | Herrala | 340/5.64 |
| 2012/0258664 | A1* | 10/2012 | Kinneberg et al. | 455/41.2 |
| 2013/0109313 | A1* | 5/2013 | Kneckt et al. | 455/41.2 |

FOREIGN PATENT DOCUMENTS

KR  10-2010-0053986 A  5/2010

* cited by examiner

*Primary Examiner* — Ping Hsieh
(74) *Attorney, Agent, or Firm* — Cha & Reiter, LLC (57) ABSTRACT

A Bluetooth device and its pairing method capable of performing an accurate pairing with a user-desired Bluetooth device provide e transmitting an inquiry message for searching for at least one peripheral Bluetooth device, and in response the peripheral Bluetooth device transmits an inquiry response message including predefined pairing acceptance mark data, then upon receiving the inquiry response message including the pairing acceptance mark data, the Bluetooth device transmits a pairing request message for pairing to the peripheral Bluetooth device that forwarded the inquiry response message.

16 Claims, 8 Drawing Sheets

BLUETOOTH DEVICE PAIRING METHOD AND BLUETOOTH DEVICE

CLAIM OF PRIORITY

This application claims the benefit under 35 U.S.C. §119 (a) of a Korean Patent Application filed in the Korean Intellectual Property Office on Dec. 24, 2012 and assigned Serial No. 10-2012-0151843, the entire disclosure of which is hereby incorporated by reference.

BACKGROUND

1. Technical Field

The present disclosure generally relates to a method and apparatus for searching and pairing peripheral Bluetooth devices.

2. Description of the Related Art

Bluetooth technology provides wireless communication without using cables and wires in a short range. Bluetooth technology uses a 2.4 GHz Industrial Scientific Medical (ISM) radio band that does not require a license for use.

Bluetooth technology is used to connect a printer, a keyboard, or a mouse to a Personal Computer (PC) including a laptop computer and a desktop computer. Bluetooth technology is also used in data transmission between various mobile terminals such as a Personal Digital Assistant (PDA), a mobile phone, a smart phone, a tablet computer, and a laptop computer. Further, it allows a headset, an earphone, or a speaker to wirelessly connect to a mobile terminal.

For communication between Bluetooth devices, pairing needs to be performed. In order for one Bluetooth device to be paired with another Bluetooth device, the Bluetooth device performs an inquiry process for searching nearby peripheral Bluetooth devices. The Bluetooth device which searches for the peripheral Bluetooth devices is a master device.

The master device transmits an inquiry message for searching nearby peripheral Bluetooth devices. A slave device close to the master device, upon receiving an inquiry message, sends an inquiry response message to the master device. The inquiry response message includes a Bluetooth device address of the slave device. The master device, upon receiving the inquiry response message, sends a remote name request message for requesting a remote name of the slave device. The remote name is a name of the Bluetooth device, for example, a model name of the Bluetooth device. The slave device, upon receiving the remote name request message, sends a remote name response message including its remote name to the master device.

The master device, upon finding one peripheral Bluetooth device or plural peripheral Bluetooth devices according to the inquiry process, displays a Bluetooth device list showing names of the found one or plural peripheral Bluetooth devices through a display. Thus, a user may recognize Bluetooth devices which may be paired from the Bluetooth device list. If the user selects a desired Bluetooth device with which the user desires pairing from the Bluetooth device list, then the master device sends a pairing request to the Bluetooth device selected by the user. Thus, pairing between the master device and the desired Bluetooth device by the user may be performed.

However, during the inquiry process, a Frequency Hopping Synchronization (FHS) scheme is used between the master device and the slave device, and the slave device scans channels based on FHS at a predetermined scan interval. Thus, even when the Bluetooth device with which the user desires the pairing among the peripheral Bluetooth devices is located closest to the master device, the closest Bluetooth device may not be first detected. Moreover, when a number of Bluetooth devices are merely included in the Bluetooth device list, the user may not easily distinguish the desired Bluetooth device the pairing from the other Bluetooth devices.

As an attempt to solve these problems, the Bluetooth device list may be displayed after being sorted based on a Received Signal Strength Indication (RSSI) of each of the Bluetooth devices of the Bluetooth device list, or an automatic pairing may be performed with a Bluetooth device having the highest RSSI. For later, the user moves the Bluetooth device, which is desired to be paired with the master device, close to the master device, such that the RSSI of the desired Bluetooth device may be measured higher in the master device than other peripheral Bluetooth devices. However, in operation, due to different power classes for different types of Bluetooth devices, the RSSIs are not correctly matched with the Bluetooth device list. For example, a Bluetooth device such as a Personal Computer (PC) is typically on the top of the Bluetooth device list. As a result, the reliability of sorting or automatic pairing based on the RSSIs of the found Bluetooth devices is not high, and a Bluetooth device other than the desired Bluetooth device may be automatically paired with the master device.

SUMMARY

Accordingly, an aspect of the embodiments of the present invention provides a Bluetooth device pairing method capable of performing accurate pairing with a user-desired Bluetooth device and a Bluetooth device thereof.

Another aspect of the embodiments of the present invention also provides a Bluetooth device pairing method and a device which enable a user to easily select a desired Bluetooth device from a Bluetooth device list for pairing.

According to an aspect of the embodiments of the present invention, a Bluetooth device pairing method includes transmitting an inquiry message for searching at least one peripheral Bluetooth device, and transmitting, upon receiving an inquiry response message including predefined pairing acceptance mark data, a pairing request message to a Bluetooth device that forwarded the inquiry response message, for pairing.

According to another aspect of the embodiments of the present invention, a Bluetooth device pairing method includes transmitting an inquiry message for searching for at least one peripheral Bluetooth device during a preset search time period, determining, upon receiving an inquiry response message including predefined pairing acceptance mark data, a Bluetooth device that forwarded the inquiry response message as a pairing acceptance mark device, checking the number of pairing acceptance mark devices which are found during the search time period, transmitting a pairing request message to the pairing acceptance mark device for pairing when the number of pairing acceptance mark devices found is one, and displaying multiple pairing acceptance mark devices in a Bluetooth device list according to a predetermined format to distinguish the multiple pairing acceptance mark devices from other Bluetooth devices in the Bluetooth device list when more than one pairing acceptance mark devices are found.

According to another aspect of the embodiments of the present invention, a Bluetooth device pairing method includes transmitting an inquiry response message including predefined pairing acceptance mark data in response to an inquiry message from a particular Bluetooth device, and performing a pairing operation upon receiving a pairing request message from the Bluetooth device.

According to another aspect of the embodiments of the present invention, a Bluetooth device includes a Bluetooth unit for performing Bluetooth communication with another Bluetooth device and a controller coupled to the Bluetooth unit and configured to transmit an inquiry message for searching a peripheral Bluetooth device, and upon receiving an inquiry response message including predefined pairing acceptance mark data, transmit a pairing request message to a Bluetooth device that forwarded the inquiry response message, for pairing with the Bluetooth device.

According to another aspect of the embodiments of the present invention, a Bluetooth device includes a Bluetooth unit for performing Bluetooth communication with another Bluetooth device, a display for displaying a Bluetooth device list, and a controller, coupled to the Bluetooth unit and the display, configured to transmit an inquiry message for searching at least one peripheral Bluetooth device during a preset search time period, upon receiving an inquiry response message including predefined pairing acceptance mark data, determine a Bluetooth device that forwarded the inquiry response message as a pairing acceptance mark device, check the number of pairing acceptance mark devices found during the search time period, transmit a pairing request message to the pairing acceptance mark device to perform pairing with the pairing acceptance mark device, if the number of pairing acceptance mark devices is one, and displays multiple pairing acceptance mark devices in a Bluetooth device list according to a predetermined format to distinguish the multiple pairing acceptance mark devices from other Bluetooth devices of the Bluetooth device list, if the number of pairing acceptance mark devices is greater than one.

According to another aspect of the embodiments of the present invention, a Bluetooth device includes a Bluetooth unit for performing Bluetooth communication with another Bluetooth device and a controller, coupled to the Bluetooth unit, configured to transmit an inquiry response message including predefined pairing acceptance mark data in response to an inquiry message form a particular Bluetooth device and perform pairing with the Bluetooth device message upon receiving a pairing request message from the Bluetooth device.

BRIEF DESCRIPTION OF THE DRAWINGS

The above and other features and advantages of exemplary embodiments of the present invention will be more apparent from the following detailed description taken in conjunction with the accompanying drawings, in which.

DETAILED DESCRIPTION

Hereinafter, exemplary embodiments of the present invention will be described in detail with reference to the accompanying drawings. In the drawings, like reference numerals refer to like components. The following description using reference numerals in the annexed drawings is intended to facilitate comprehensive understanding of the embodiments of the present invention as defined in the claims and equivalents thereof.

To help understanding of the embodiments of the present invention, various specific details are included, but they should be regarded as being illustrative. Therefore, those of ordinary skill in the art may recognize that various changes and modifications of the embodiments described below may be made without departing the scope and spirit of the present invention. Moreover, description of well-known functions or components may be omitted for clarity and brevity.

The terms and words used in the following description and claims are not limited to the bibliographical meanings, but, are merely used by the inventor to enable a clear and consistent understanding of the invention. Accordingly, definitions of the terms and words should be made based on all the details of the specification.

Hereinafter, a description will be made of embodiments of the present invention in which embodiments of the present invention are applied to a Bluetooth mobile terminal and a Bluetooth speaker among various Bluetooth devices having a Bluetooth function. The Bluetooth mobile terminal refers to mobile terminal having a Bluetooth function, and the Bluetooth speaker refers to a speaker having a Bluetooth function. In addition, a description will be made of embodiments of the present invention in which the Bluetooth mobile terminal is a master device and the Bluetooth speaker is a slave device. However, these are merely examples to facilitate explanation of the embodiments of the present invention. Therefore, the embodiments of the present invention may also be applied to other devices having a similar technical background. Moreover, the embodiments of the present invention may be applied to other devices known by artisans through some modifications which do not depart from the scope of the present invention. For example, a desktop computer having a Bluetooth device, may be a master device according to an embodiment of the present invention, and a wireless headset or a wireless earphone having a Bluetooth function may also be a slave device according to an embodiment of the present invention. Moreover, the slave device according to an embodiment of the present invention may be the Bluetooth mobile terminal.

Figure 1:
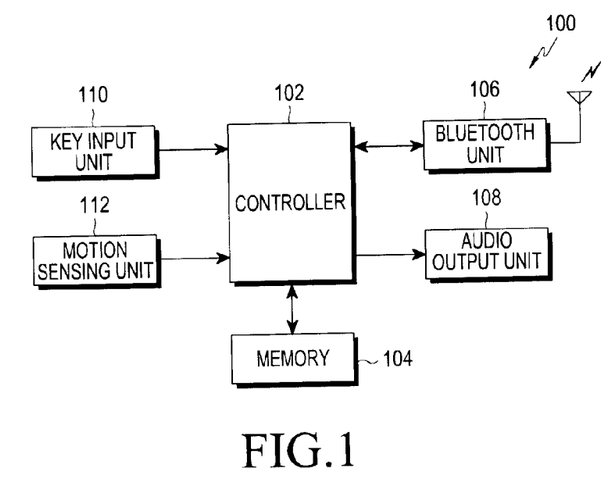
FIG. 1 is a block diagram illustrating a Bluetooth speaker according to an embodiment of the present invention.

FIG. 1 is a block diagram illustrating a Bluetooth speaker 100 according to an embodiment of the present invention. In operation, the Bluetooth speaker 100 receives an audio signal from a Bluetooth device such as a Bluetooth mobile terminal described below through Bluetooth communication, and outputs audio corresponding to audio data through a speaker.

Referring to FIG. 1, the Bluetooth speaker 100 includes a controller 102, a memory 104, a Bluetooth unit 106, an audio output unit 108, a key input unit 110, and a motion sensing unit 112. The memory 104 stores a program for operations of the controller 102 and stores various data corresponding to the operations of the controller 102. The Bluetooth unit 106 performs Bluetooth communication with another Bluetooth device. The audio output unit 108 includes a speaker through which audio is output. The key input unit 110 receives a user input and provides the user input to the controller 102. The key input unit 110 may include one key such as a power key, and may further include a key such as a volume control key. The motion sensing unit 112 senses motion of the Bluetooth speaker 100 and provides the sensed motion to the controller 102. The motion sensing unit 112 may include an acceleration sensor as a motion sensor for sensing the motion of the Bluetooth speaker 100.

The controller 102, upon receiving an inquiry message from another Bluetooth device serving as a master device via the Bluetooth unit 106, checks the pairing acceptance setting. If the pairing acceptance setting is set to 'ON', the controller 102 sends an inquiry response message including predefined Pairing Acceptance Mark (PAM) data to a master device via the Bluetooth unit 106. If the pairing acceptance setting is set to 'OFF', the controller 102 sends a general inquiry response message which does not include the PAM data to the master device via the Bluetooth unit 106. Thereafter, the controller 102, upon receiving a pairing request message from the master device via the Bluetooth unit 106, performs pairing with the master device through the Bluetooth unit 106.

The pairing acceptance setting may be set to either 'ON' or 'OFF' by the user of the Bluetooth speaker 100 in various manners. For example, the pairing acceptance setting may be set to either 'ON' or 'OFF' by a preset user input. In another example, the pairing acceptance setting may be set to either 'ON' or 'OFF' by a preset motion of the Bluetooth speaker 100 made by the user. The controller 102, upon sensing a preset user input entered via the key input unit 110 or a preset motion detected via the motion sensing unit 112, sets the pairing acceptance setting to 'ON'. The preset user input may be made, for example, by the user inputting a particular key of the key input unit 110, such as the power key, for duration longer by a predetermined time period than a typical input time of that key. The preset motion may be made, for example, by the user shaking the Bluetooth speaker 100 once from side to side. The pairing acceptance setting set to 'ON' may be changed to 'OFF' if the power of the Bluetooth speaker 100 is turned off.

Meanwhile, in actual implementation of the present invention, the pairing acceptance setting may be set to 'ON' by the user based on either a user input or motion sensing, or any combination thereof. If motion sensing is not applied, the motion sensing unit 112 is not necessary. The pairing acceptance setting may be set to 'ON' based on a combination of the user input and the motion sensing, for example, when a preset motion of the Bluetooth speaker 100 is sensed during input of the power key longer than a typical input time of the power key.

The controller 102 includes PAM data in an inquiry response message by using an Extended Inquiry Response (EIR) of the inquiry response message. The EIR is included in the inquiry response message according to Bluetooth standards.

Figure 2:
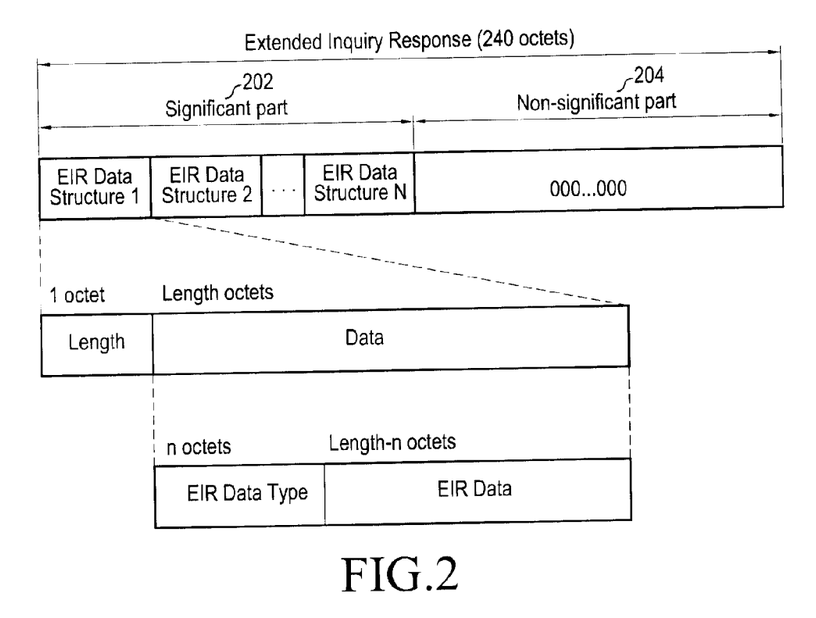
FIG. 2 is a diagram illustrating an Extended Inquiry Response (EIR) data format according to Bluetooth specifications.

FIG. 2 is a diagram illustrating an EIR data format according to Bluetooth specifications. The EIR data format of FIG. 2 is disclosed in the Bluetooth specification, for example, core version 4.0 [Vol 3] "FIG. 8.1 Extended Inquiry Response data format". Referring to FIG. 2, the EIR has a length of 240 octets and may include multiple EIR data structures, each of which includes a length field including a value indicating a length of the corresponding EIR data structure and a data field including data. The data field includes an EIR data type field and an EIR data field. Parts including the EIR data structures form a significant part and the other parts form a non-significant part.

According to the Bluetooth specifications, EIR data types included in the EIR include service class Universally Unique Identifiers (UUIDs), a local name, manufacturer specific data, and so forth. A manufacturer of a Bluetooth device may include and use data of 2 octets or more as manufacturer specific data in EIR data. The Bluetooth specifications stipulate that a value indicating a type of the manufacturer specific data is '0xFF' and the first 2 octets of the manufacturer specific data includes a company identifier code for identifying the manufacturer.

Figure 3:
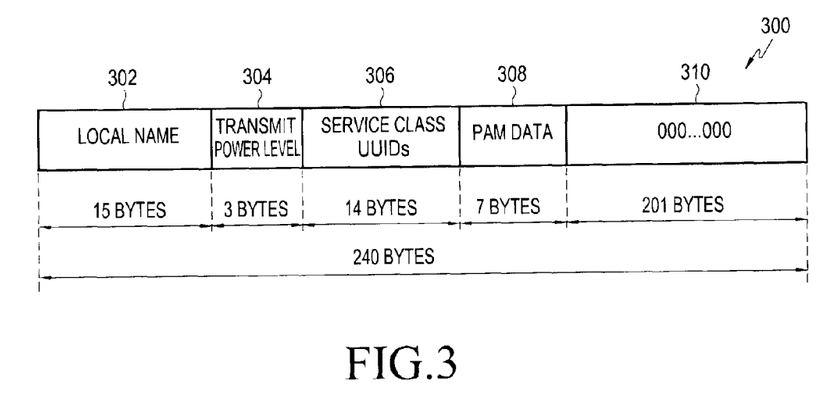
FIG. 3 is a diagram illustrating an example of an EIR according to an embodiment of the present invention.

FIG. 3 is a diagram illustrating an example of an EIR according to an embodiment of the present invention, in which an example of an EIR 300 which is implemented based on the EIR data format of FIG. 2 is shown.

Referring to FIG. 3, the EIR 300 includes a local name 302, a transmit power level 304, service class UUIDs 306, and PAM data 308. A portion including the local name 302, the transmit power level 304, the service class UUIDs 306, and the PAM data 308 corresponds to a significant part (202) of FIG. 2, and a part 310 corresponds to a non-significant part (204). In FIG. 3, for example, the local name 302, the transmit power level 304, the service class UUIDs 306, and the PAM data 308 have sizes of 15 bytes, 3 bytes, 14 bytes, and 7 bytes, respectively. Then, among the total size of 240 bytes (octets), as shown in FIG. 2, of the EIR 300, 39 bytes form a significant part (202) and 201 bytes form the non-significant part 310 (204). As shown in FIG. 3, the EIR 300 includes the PAM data 308 as EIR data. The PAM data 308 may be configured as shown in FIG. 4.

Figure 4:
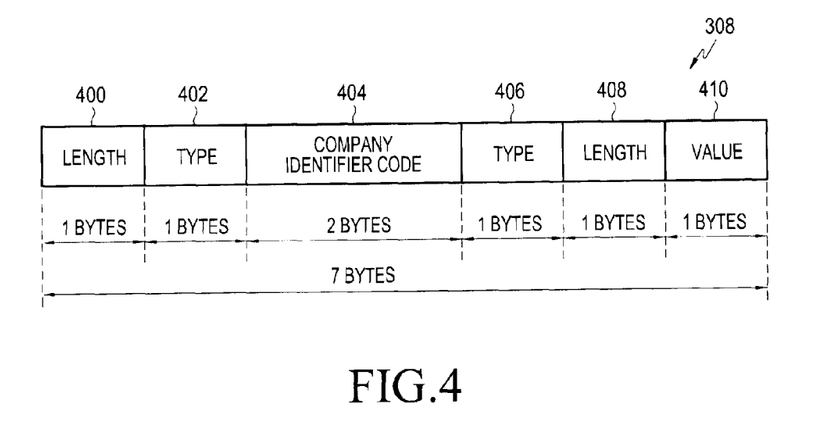
FIG. 4 is a diagram illustrating an example of a Pairing Acceptance Mark (PAM) data according to an embodiment of the present invention.

FIG. 4 is a diagram illustrating an example of PAM data 308 according to an embodiment of the present invention. As shown, the size of the PAM data 308 is 7 bytes and fields of the PAM data 308 may include a 1-byte length 400, a 1-byte type 402, a 2-byte company identifier code 404, a 1-byte type 406, a 1-byte length 408, and a 1-byte value 410. The length 400 has a value '7' indicating the total size of the PAM data 308. The type 402 has a value '0xFF' indicating that the type of the PAM data 308 is manufacturer specific data. The company identifier code 404 has a company identifier code value allocated to a manufacturer of a Bluetooth device according to an embodiment of the present invention. The type 406 has a value indicating that the data type of the value 410 is PAM, for example, has a value '0x00'. The length 408 has a value '1' indicating the size of the value 410, which is a data field following the length 408. The value 410 may be, for example, '0x01'.

Figure 5:
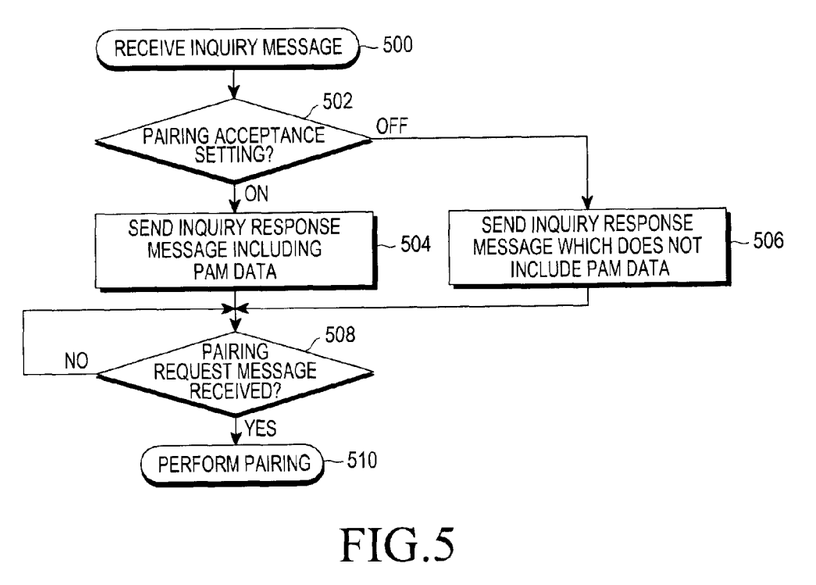
FIG. 5 is a flowchart illustrating an operation process of a Bluetooth speaker according to an embodiment of the present invention.

FIG. 5 illustrates operation steps of the Bluetooth speaker 100 according to an embodiment of the present invention, in which the Bluetooth speaker 100 of FIG. 1 receives an inquiry message from another Bluetooth device.

Referring to FIG. 5, upon receiving an inquiry message from another Bluetooth device via the Bluetooth unit 106 in step 500, the controller 102 checks for the pairing acceptance setting in step 502. If the pairing acceptance setting is 'ON', the controller 102 sends an inquiry response message having the EIR 300 including the PAM data 308 as EIR data to a master device via the Bluetooth unit 106. The master device is a Bluetooth device which sends the inquiry message. On the other hand, if the paring acceptance setting is 'OFF', the controller 102 sends a typical inquiry response message which does not include the PAM data 308 to the master device through the Bluetooth unit 106 in step 506. Thereafter, upon receiving a pairing request message from the master device through the Bluetooth unit 106 in step 508, the controller 102 performs pairing with the master device through the Bluetooth unit 106 in step 510.

Figure 6:
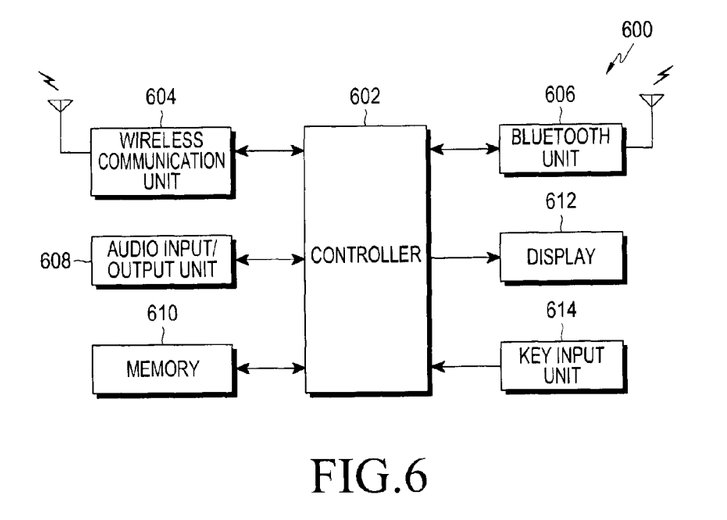
FIG. 6 is a block diagram illustrating a Bluetooth mobile terminal according to an embodiment of the present invention.

FIG. 6 is a block diagram illustrating a Bluetooth mobile terminal 600 according to an embodiment of the present invention. Referring to FIG. 6, the Bluetooth mobile terminal 600 includes a controller 602, a wireless communication unit 604, a Bluetooth unit 606, an audio input/output unit 608, a memory 610, a display 612, and a key input unit 614.

The wireless communication unit 604 transmits and receives a wireless signal for a mobile communication function of the Bluetooth mobile terminal 600 with a mobile communication network. The Bluetooth unit 606 performs Bluetooth communication with another Bluetooth device. The audio input/output unit 608 includes an audio output device such as a speaker and an audio input device such as a microphone, and inputs and outputs various audio corresponding to operations of the Bluetooth mobile terminal 600. The memory 610 stores a program for the operations of the controller 602, and stores various data corresponding to the operations of the controller 602. The memory 610 may further include an external memory and a storage device such as a Hard Disk Drive (HDD). The display 612 displays an image corresponding to the operations of the controller 602. The key input unit 614 provides various key inputs from the user, which are necessary for the operations of the Bluetooth mobile terminal 600, to the controller 602. The key input unit 614 may include a touch screen panel installed on the display 612, and may include keys for inputting numeric and character information and function keys for setting various functions. The controller 602 controls the wireless communication unit 604, the Bluetooth unit 606, the audio input/output unit 608, the memory 610, the display 612, and the key input unit 614 for typical functions of the Bluetooth mobile terminal 600.

In addition, if a Bluetooth device search input is received from a user via the key input unit 614, the controller 602 sends an inquiry message through the Bluetooth unit 606 and upon receiving an inquiry response message including PAM data from another Bluetooth device via the Bluetooth unit 606, then the controller 602 performs pairing with a slave device via the Bluetooth unit 606. Here, the slave device is a Bluetooth device which sends the inquiry response message.

Figure 7:
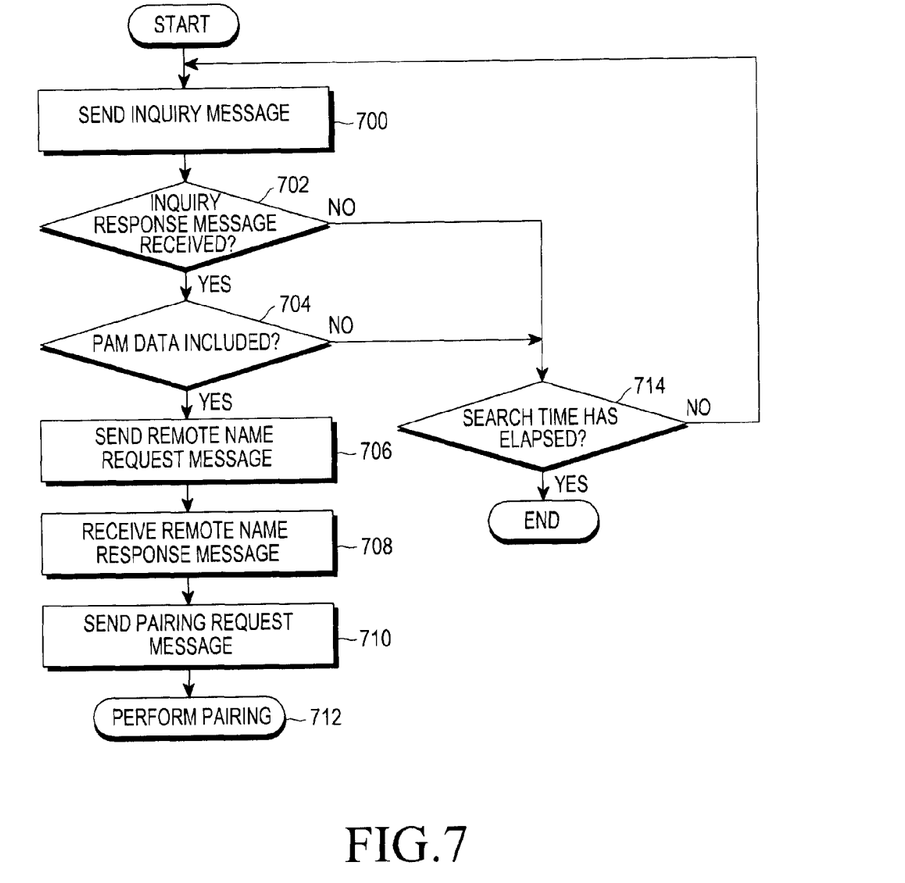
FIG. 7 is a flowchart illustrating an operation process of a Bluetooth mobile terminal according to another embodiment of the present invention.

FIG. 7 is a flowchart showing an operation process of the Bluetooth mobile terminal 600 according to an embodiment of the present invention where there is a Bluetooth device search input to the Bluetooth mobile terminal 600 from a user.

Referring to FIG. 7, in step 700, the controller 602 sends an inquiry message via the Bluetooth unit 606. In response, the controller 602 determines whether an inquiry response message is received from another Bluetooth device via the Bluetooth unit 606 in step 702. The controller 602 executes step 704 when receiving the inquiry response message, and executes step 714 if not.

In step 704, the controller 602 determines whether the PAM data 308 is included in the received inquiry response message. The controller 602 executes step 706 if the PAM data 308 is included in the inquiry response message; otherwise, if the PAM data 308 is not included in the inquiry response message, the controller 602 executes step 714.

In step 706, the controller 602 sends a remote name request message to a slave device via the Bluetooth unit 606. Here, the slave device is a Bluetooth device which sends the inquiry response message. The controller 602, after receiving a remote name response message from the slave device via the Bluetooth unit 606 in step 708, sends a pairing request message to the slave device via the Bluetooth unit 606 in step 710, and performs pairing with the slave device through the Bluetooth unit 606 in step 712.

In step 714, the controller 602 determines whether a search time has elapsed. The search time is a time which is preset to limit duration for searching for another Bluetooth device. The controller 602 goes back to step 700 if the search time has not elapsed; otherwise, if the search time has elapsed, the controller 602 terminates Bluetooth device search.

As explained above, the master device searches for a Bluetooth device in which pairing acceptance is set among peripheral Bluetooth devices, and performs an automatic pairing operation with the found Bluetooth device. That is, searching and pairing occurs only with the Bluetooth device in which the pairing acceptance is set. Hence, a more correct pairing may be achieved with a Bluetooth device with which the user desires pairing. Moreover, by merely inputting a preset user input to a target Bluetooth device which is a search target or making a preset motion while holding the target Bluetooth device, the user may conveniently achieve the pairing of the target Bluetooth device with the master device. Again, the preset motion may be made, for example, by the user shaking the Bluetooth speaker 100 once from side to side.

Meanwhile, in the above description, pairing acceptance setting of the Bluetooth speaker 100 may be selectively set to either 'ON' or 'OFF' by the user. In addition, according to the pairing acceptance setting state, whether to include the PAM data in the inquiry response message is determined. However, according to another embodiment, if the Bluetooth speaker 100 receives the inquiry message, the PAM data may be transmitted through the inquiry response message by default, regardless of the pairing acceptance setting state. Hence, the user-desired Bluetooth device may be paired with the master device without a need for the user to make a separate user input or motion. In this case, steps 502 and 506 of FIG. 5 may be omitted. That is, the controller 102 of the Bluetooth speaker 100 performs step 504 immediately after step 500.

In addition, in the foregoing description, if the Bluetooth mobile terminal 600 receives the inquiry response message, it determines whether the inquiry response message includes the PAM data, such that if the inquiry response message includes the PAM data, the Bluetooth mobile terminal 600 performs an automatic pairing with the slave device. However, according to another embodiment, automatic pairing of the Bluetooth mobile terminal 600 may be selectively set by the user. That is, the controller 602 of the Bluetooth mobile terminal 600 may perform the automatic pairing as shown in FIG. 7 only when the user sets automatic pairing, and if the user has not set the automatic pairing, the controller 602 may perform a typical pairing procedure.

If there are multiple Bluetooth devices in which pairing acceptance setting is set to 'ON' among peripheral Bluetooth devices, the master device may receive inquiry response messages including PAM data from the multiple Bluetooth devices during a search period. This case may correspond to a case where the user puts the Bluetooth mobile terminal and the Bluetooth speaker near a Bluetooth headset which is not turned off after the user sets pairing acceptance setting to 'ON' in advance, and sets pairing acceptance setting of the Bluetooth speaker to 'ON' in an attempt to pair with the Bluetooth mobile terminal.

If the Bluetooth mobile terminal 600, which is the master device, receives the inquiry response messages including the PAM data from the multiple Bluetooth devices, then the controller 602 sorts and marks the Bluetooth devices that sent the inquiry response messages including the PAM data in the Bluetooth device list in such a way to distinguish such Bluetooth devices from the other Bluetooth devices of the Bluetooth device list with bold letters, for example, and displays them through the display 612. In the specification, the Bluetooth device that transmitted the inquiry response message including the PAM data in response to the inquiry message will be referred to as a 'PAM device'.

Figure 8:
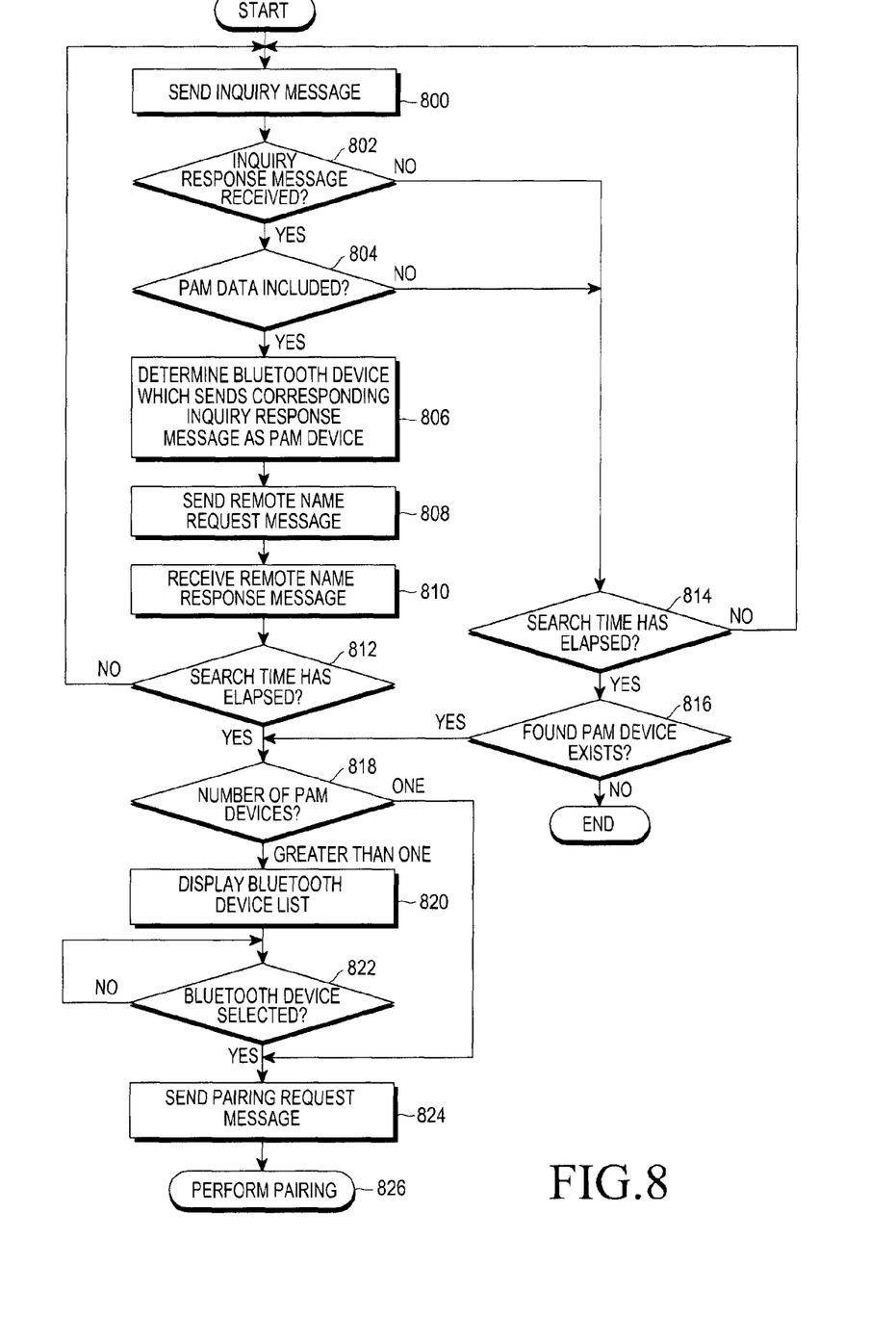
FIG. 8 is a flowchart illustrating an operation process of a Bluetooth mobile terminal according to still another embodiment of the present invention.

FIG. 8 is a flowchart showing an operation of the Bluetooth mobile terminal 600 according to another embodiment of the present invention where there is a Bluetooth device search input to the Bluetooth mobile terminal from a user.

Referring to FIG. 8, the controller 602 sends an inquiry message via the Bluetooth unit 606 in step 800. In response, the controller 602 determines whether an inquiry response message is received from another Bluetooth device via the Bluetooth unit 606 in step 802. The controller 602 performs step 804 if receiving the inquiry response message; otherwise, if not receiving the inquiry response message, the controller 602 performs step 814.

In step 804, the controller 602 determines whether the received inquiry response message includes the PAM data 308. The controller 602 performs step 806 if the inquiry response message includes the PAM data 308; otherwise, if the inquiry response message does not include the PAM data 308, the controller 602 performs step 814.

In step 806, the controller 602 determines that a Bluetooth device that forwarded the inquiry response message, that is, the inquiry response message including the PAM data 308 is a PAM device. In step 808, the controller 602 sends a remote name request message to a slave device via the Bluetooth unit 606. Here, the slave device is the Bluetooth device that transmitted the inquiry response message. The controller 602 receives a remote name response message from the slave device via the Bluetooth unit 606 in step 810. The controller 602 then determines whether search duration has elapsed. If the search duration has not elapsed, the controller 602 goes back to step 800; otherwise, if the search duration has elapsed, the controller 602 performs 818.

In step 814, the controller 602 determines whether the search duration has elapsed. If the search duration has not elapsed, the controller 602 goes back to step 800; otherwise, if the search duration has elapsed, the controller 602 performs step 816. In step 816, the controller 602 determines whether there is a found PAM device. The controller 602 performs step 818 if there is the found PAM device; otherwise, if there is no found PAM device, the controller 602 terminates Bluetooth device search.

In step 818, the controller 602 checks the number of PAM devices, that is, the number of PAM devices which are found during a search operation. If the number of PAM devices is 1, the controller 602 performs step 824, and if the number of PAM devices is greater than 1, the controller 602 performs step 820. In step 820, the controller 602 displays a Bluetooth device list including the found Bluetooth devices through the display 612. To this end, the controller 602 sorts and marks the multiple PAM devices in the Bluetooth device list in such a way that the multiple PAM devices are distinguished from the other Bluetooth devices of the Bluetooth device list. For example, names of the PAM devices may be sorted in front of names of the other Bluetooth devices and further marked with bold letters. As a result, the user may easily recognize the found PAM devices and then selectively select a PAM device with which the user desires pairing. In the Bluetooth device list, the PAM devices may be sorted in an order of RSSI strength.

Thereafter, when the user selects the desired Bluetooth device through the key input unit 614 in step 822, then the controller 602 performs step 824. In step 824, the controller 602 sends a pairing request message to a slave device via the Bluetooth unit 606. In step 826, the controller 602 performs the pairing with the slave device via the Bluetooth unit 606. The slave device is a PAM device which is only found during the search operation or the Bluetooth device which is selected by the user in step 822.

According to another embodiment of the present invention, the controller 602 may perform an automatic pairing with a PAM device having the highest RSSI among the PAM devices, instead of receiving a selection of the Bluetooth device from the user in step 822.

As stated in the description of FIG. 7 as well in the embodiment of FIG. 8, a user may selectively set an automatic pairing of the Bluetooth mobile terminal 600. That is, the controller 602 of the Bluetooth mobile terminal 600 may perform the automatic pairing of FIG. 8 only when the user sets the automatic pairing, and if the user does not set the automatic pairing, the controller 602 may perform a typical pairing procedure. A user's selective setting of automatic pairing described thus far may also be similarly applied to the following embodiments shown in FIGS. 10 and 11.

Meanwhile, according to another embodiment of the present invention, the PAM data 308 may be included in the inquiry response message to correspond to ON/OFF of pairing acceptance setting. In this case, the PAM data 308 illustrated in FIGS. 3 and 4 may be set to either 'ON' or 'OFF'. In other words, if pairing acceptance setting is 'ON', the controller 102 of the Bluetooth speaker 100 sets the PAM data 308 to 'ON' and includes the same in the inquiry response message; if pairing acceptance setting is 'OFF', the controller 102 may set the PAM data 308 to 'OFF' and includes the same in the inquiry response message. For example, a value 410 of the PAM data 308 is '0x01' if the PAM data 308 is set to 'ON', and is '0x00' if the PAM data 308 is set to 'OFF'.

Figure 9:
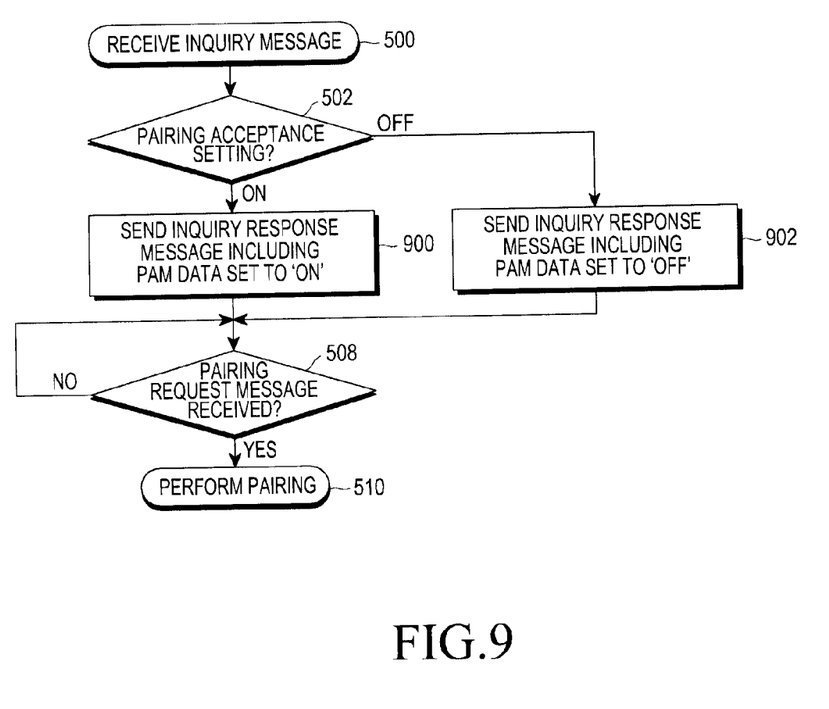
FIG. 9 is a flowchart illustrating an operation process of a Bluetooth speaker according to another embodiment of the present invention.

FIG. 9 is a flowchart showing an operation process of the Bluetooth speaker 100 according to another embodiment of the present invention, in which the PAM data 308 is included to correspond to 'ON'/'OFF' of pairing acceptance setting. In FIG. 9, steps 504 and 506 of FIG. 5 are replaced with steps 900 and 902. Therefore, steps 500, 502, 508, and 510 of FIG. 9 are the same as those of FIG. 5, and thus will not be described to avoid redundancy.

If pairing acceptance setting is set to 'ON' in step 502, then the controller 102 sends the PAM data 308 which is set to 'ON' to the master device through the inquiry response message in step 900 and then performs step 508. If pairing acceptance setting is set to 'OFF' in step 502, the controller 102 sends the PAM data 308 which is set to 'OFF' to the master device through the inquiry response message in step 902.

As stated in the description of FIG. 5, also in the embodiment of FIG. 9, if the Bluetooth speaker 100 receives the inquiry message, the PAM data, which is set to 'ON', may be transmitted through the inquiry response message by default, regardless of the pairing acceptance setting state. In this case, steps 502 and 902 of FIG. 9 may be omitted. That is, the controller 102 of the Bluetooth speaker 100 performs step 900 immediately after step 500 of FIG. 9.

Figure 10:
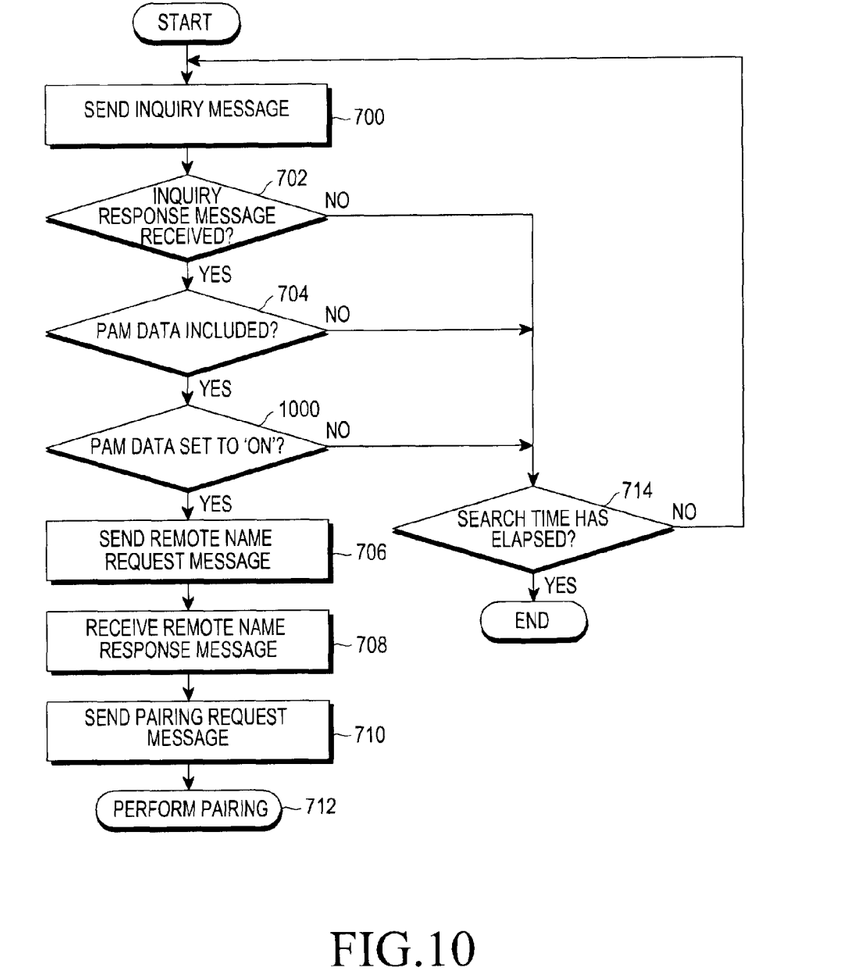
FIG. 10 is a flowchart illustrating an operation process of a Bluetooth mobile terminal according to still another embodiment of the present invention.

FIG. 10 is a flowchart showing an operation process of the Bluetooth mobile terminal 600 according to yet another embodiment of the present invention, in which in FIG. 7, step 1000 is added to correspond to FIG. 9. Therefore, steps 700 through 714 of FIG. 10 are the same as those of FIG. 7, and thus will not be described to avoid redundancy.

If the PAM data 308 is included in the inquiry response message in step 704, the controller 602 checks the value 410 of the PAM data 308 to determine whether the PAM data 308 is set to 'ON' in step 1000. The controller 602 performs step 706 if the PAM data 308 is set to 'ON', and performs step 714 if the PAM data 308 is set to 'OFF'.

Figure 11:
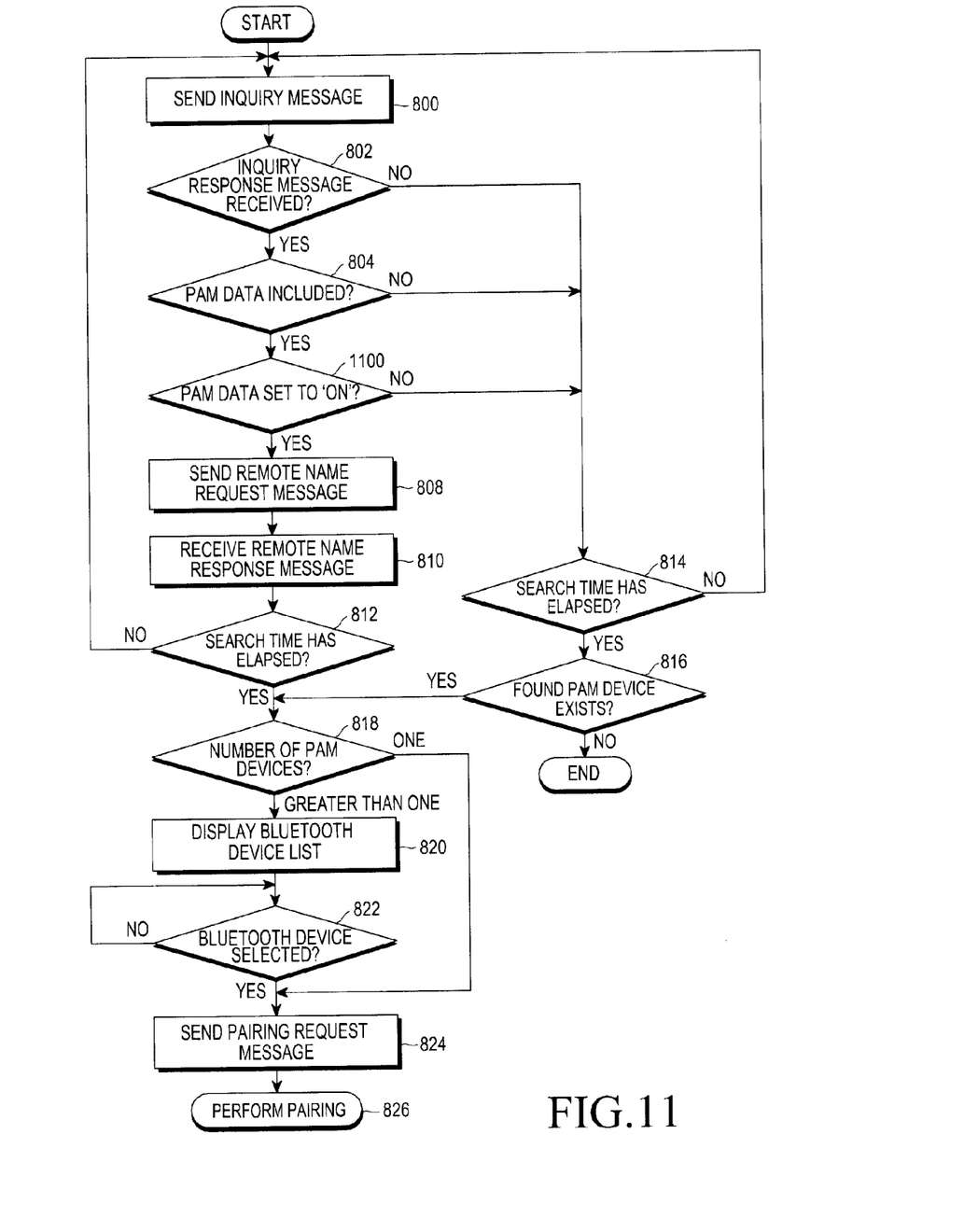
FIG. 11 is a flowchart illustrating an operation process of a Bluetooth mobile terminal according to further another embodiment of the present invention.

FIG. 11 is a flowchart showing an operation step of the Bluetooth mobile terminal according to further another embodiment of the present invention, in which in FIG. 8, step 1100 is added to correspond to FIG. 9. Therefore, steps 800 through 826 of FIG. 11 are the same as those of FIG. 8 and thus will not be described to avoid redundancy.

If the PAM data 308 is included in the inquiry response message in step 804, the controller 602 checks the value 410 of the PAM data 308 to determine whether the PAM data 308 is set to 'ON' in step 1100. If the PAM data 308 is set to 'ON', the controller 602 performs step 808; otherwise, if the PAM data 308 is set to 'OFF', the controller 602 performs step 814.

When the Bluetooth device pairing method according to the embodiments of the present invention is applied to the Bluetooth mobile device, the Bluetooth mobile device may download a program (for example, an application) for Bluetooth device pairing from a program providing device (for example, a server) which is located remotely or install the program and execute the program for use in Bluetooth device pairing. That is, once the program for Bluetooth device pairing is installed in the Bluetooth mobile device, it is executed in the Bluetooth mobile device to provide the pairing of the Bluetooth devices. The program providing device transmits the program to the Bluetooth mobile device in response to a request for transmission of the program from the Bluetooth mobile device or automatically. The program providing device may additionally perform a service subscription determination, a user authentication, and a payment information checking with respect to the Bluetooth mobile device. The program providing device may include a communication unit for performing wired or wireless communication with the Bluetooth mobile device, a storage medium for storing the program, and a controller for transmitting the program to the Bluetooth mobile device through the communication unit. The storage medium may be located inside or outside the program providing device.

It can be seen that the embodiments of the present invention can be implemented with hardware, software, or a combination of hardware and software. Such arbitrary software may be stored, whether or not erasable or re-recordable, in a volatile or non-volatile storage such as a Read-Only Memory (ROM), or a Random Access Memory (RAM) and an optically or magnetically recordable and machine (e.g., computer)-readable storage medium such as a Compact Disc (CD), a Digital Versatile Disk (DVD), a magnetic disk, or a magnetic tape. Therefore, the present invention includes a program including codes for implementing an apparatus or method claimed in an arbitrary claim and a machine-readable storage medium for storing such a program. The program may be electronically transferred through an arbitrary medium such as a communication signal delivered through wired or wireless connection, and the present invention properly includes equivalents thereof.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present invention has been particularly illustrated and described with reference to exemplary embodiments thereof, various modifications or changes can be made without departing from the scope of the present invention. Therefore, the scope of the present invention is not limited to the disclosed embodiments, and it should be defined by the scope of the following claims and equivalents thereof.

What is claimed is:

1. A Bluetooth pairing method comprising:
   transmitting an inquiry message for searching at least one peripheral Bluetooth device;
   receiving an inquiry response message from the at least one peripheral Bluetooth device in response to the inquiry message;
   determining whether the receivd inquiry response message includes predefined pairing acceptance mark data;
   determining whether the pairing acceptance mark data is set to an ON state, when the received inquiry response message includes the pairing acceptance mark data;
   ignoring the received inquiry response message, when the received inquiry response message does not include the pairing acceptance mark data or the pairing acceptance mark data is set to an OFF state; and
   transmitting a pairing request message to the at least one peripheral Bluetooth device for pairing, when the received inquiry response message includes the pairing acceptance mark data and the pairing acceptance mark data is set to the ON state.

2. The Bluetooth pairing method of claim 1, wherein the pairing acceptance mark data is included as Extended Inquiry Response (EIR) data in an EIR of the inquiry response message.

3. A Bluetooth pairing method comprising:
   transmitting an inquiry message for searching at least one peripheral Bluetooth device during a preset search time period;

receiving an inquiry response message from the at least one peripheral Bluetooth device in response to the inquiry message;

determining whether the received inquiry response message includes predefined pairing acceptance mark data;

determining whether the pairing acceptance mark data is set to an ON state, when the received inquiry response message includes the pairing acceptance mark data;

ignoring the received inquiry response message, when the received inquiry response message does not include the pairing acceptance mark data or the pairing acceptance mark data is set to an OFF state;

determining the at least one peripheral Bluetooth device that forwarded the inquiry response message as a pairing acceptance mark device, when the received inquiry response message includes the pairing acceptance mark data and the pairing acceptance mark data is set to the ON state;

checking a number of pairing acceptance mark devices which are found during the preset search time period;

transmitting a pairing request message to the pairing acceptance mark device for pairing when only one pairing acceptance mark device found; and displaying a Bluetooth device list including the found pairing acceptance mark devices marked according to a predetermined format to distinguish the found pairing acceptance mark devices from other Bluetooth devices when more than one pairing acceptance mark device are found.

4. The Bluetooth pairing method of claim 3, wherein the pairing acceptance mark data is included as Extended Inquiry Response (EIR) data in an EIR of the inquiry response message.

5. A Bluetooth pairing method comprising:
receiving an inquiry message from a Bluetooth device;
checking a pairing acceptance setting;
transmitting an inquiry response message including predefined pairing acceptance mark data which is set to an OFF state to the Bluetooth device, when the pairing acceptance setting is set to an OFF state;
transmitting an inquiry response message including the pairing acceptance mark data which is set to an ON state to the Bluetooth device, when the pairing acceptance setting is set to an ON state;
receiving a pairing request message from the Bluetooth device; and
performing a pairing with the Bluetooth device.

6. The Bluetooth pairing method of claim 5, wherein the transmitting comprises including a pairing acceptance mark data as Extended Inquiry Response (EIR) data in an EIR of the inquiry response message.

7. The Bluetooth pairing method of claim 6, further comprising setting the pairing acceptance setting to the ON state when a predetermined motion of a Bluetooth device which checks the pairing acceptance setting is sensed.

8. The Bluetooth pairing method of claim 6, further comprising setting the pairing acceptance setting to the ON state when a predetermined user input is detected.

9. A Bluetooth apparatus comprising:
a Bluetooth unit for performing Bluetooth communication; and
a controller, coupled to the Bluetooth unit, configured to:
transmit an inquiry message for searching at least one peripheral Bluetooth device,
receive an inquiry response message from the at least one peripheral Bluetooth device in response to the inquiry message;

determine whether the received inquiry response message includes predefined pairing acceptance mark data;

determine whether the pairing acceptance mark data is set to an ON state, when the received inquiry response message includes the pairing acceptance mark data;

ignore the received inquiry response message, when the received inquiry response message does not include the pairing acceptance mark data or the pairing acceptance mark data is set to an OFF state; and transmit a pairing request message to the at least one Bluetooth device for pairing, when the received inquiry response message includes the pairing acceptance mark data and the pairing acceptance mark data is set to the ON state.

10. The Bluetooth apparatus of claim 9, wherein the pairing acceptance mark data is included as Extended Inquiry Response (EIR) data in an EIR of the inquiry response message.

11. A Bluetooth apparatus comprising:
a Bluetooth unit for performing Bluetooth communication;
a display for displaying a Bluetooth device list; and
a controller, coupled to the Bluetooth unit and the display, configured to:
transmit an inquiry message for searching at least one peripheral Bluetooth device during a preset search time period;
receive an inquiry response message from the at least one peripheral Bluetooth device in response to the inquiry message;
determine whether the received inquiry response message includes predefined pairing acceptance mark data;
determine whether the pairing acceptance mark data is set to an ON state, when the received inquiry response message includes the pairing acceptance mark data;
ignore the received inquiry response message, when the received inquiry response message does not include the pairing acceptance mark data or the pairing acceptance mark data is set to an OFF state;
determine the at least one peripheral Bluetooth device that forwarded the inquiry response message as a pairing acceptance mark device, when the received inquiry response message includes the pairing acceptance mark data and the pairing acceptance mark data is set to the ON state;
check a number of pairing acceptance mark devices which are found during the preset search time period;
transmit a pairing request message to the pairing acceptance mark device for pairing when only one pairing acceptance mark device is found; and
display a Bluetooth device list including the found pairing acceptance mark devices marked according to a predetermined format to distinguish the found pairing acceptance mark devices from other Bluetooth devices when more than one pairing acceptance mark devices are found.

12. The Bluetooth apparatus of claim 11, wherein the pairing acceptance mark data is included as Extended Inquiry Response (EIR) data in an EIR of the inquiry response message.

13. A Bluetooth apparatus comprising:
a Bluetooth unit for performing Bluetooth communication; and
a controller, coupled to the Bluetooth unit, configured to:
receive an inquiry message from a Bluetooth device;
check a pairing acceptance setting;
transmit an inquiry response message including predefined pairing acceptance mark data which is set to an OFF state to the Bluetooth device, when the pairing acceptance setting is set to an OFF state;
transmit an inquiry response message including the pairing acceptance mark data which is set to an ON state to the Bluetooth device, when the pairing acceptance setting is set to an ON state;
receive a pairing request message from the Bluetooth device; and
perform pairing with the at least one Bluetooth device.

14. The Bluetooth apparatus of claim 13, wherein the controller includes the pairing acceptance mark data as Extended Inquiry Response (EIR) data in an EIR of the inquiry response message.

15. The Bluetooth apparatus of claim 13, further comprising a motion sensor for sensing a motion of the Bluetooth apparatus, wherein the controller sets the pairing acceptance setting to the ON state when a preset motion is sensed by the motion sensor.

16. The Bluetooth apparatus of claim 13, further comprising a key input unit for receiving a user input, wherein the controller sets the pairing acceptance setting to the ON state when a preset user input is inputted through the key input unit.

\* \* \* \* \*